July 18, 1967 C. P. KOLTHOFF, JR 3,331,288
PISTON MACHINE
Filed Jan. 7, 1965 2 Sheets-Sheet 2
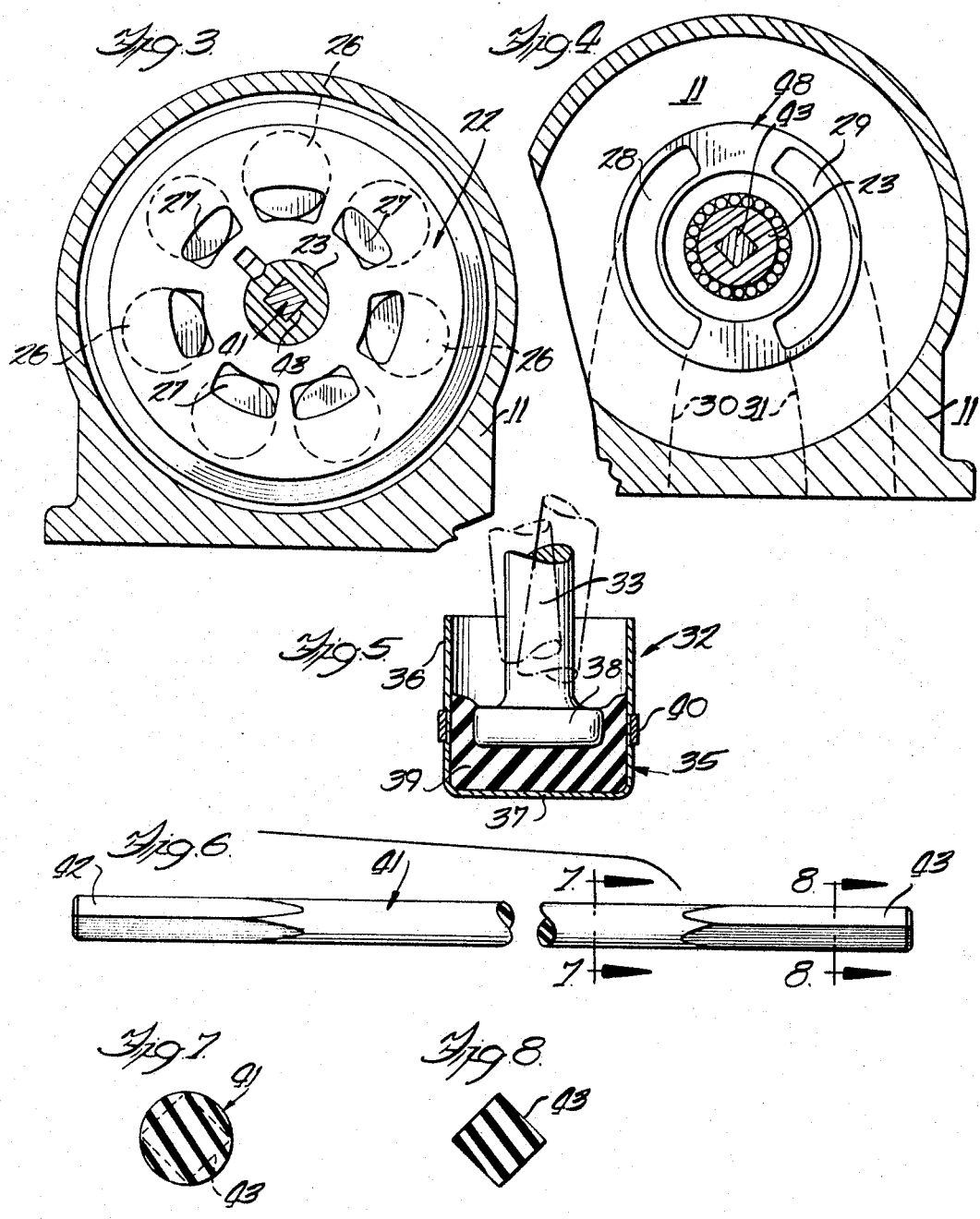

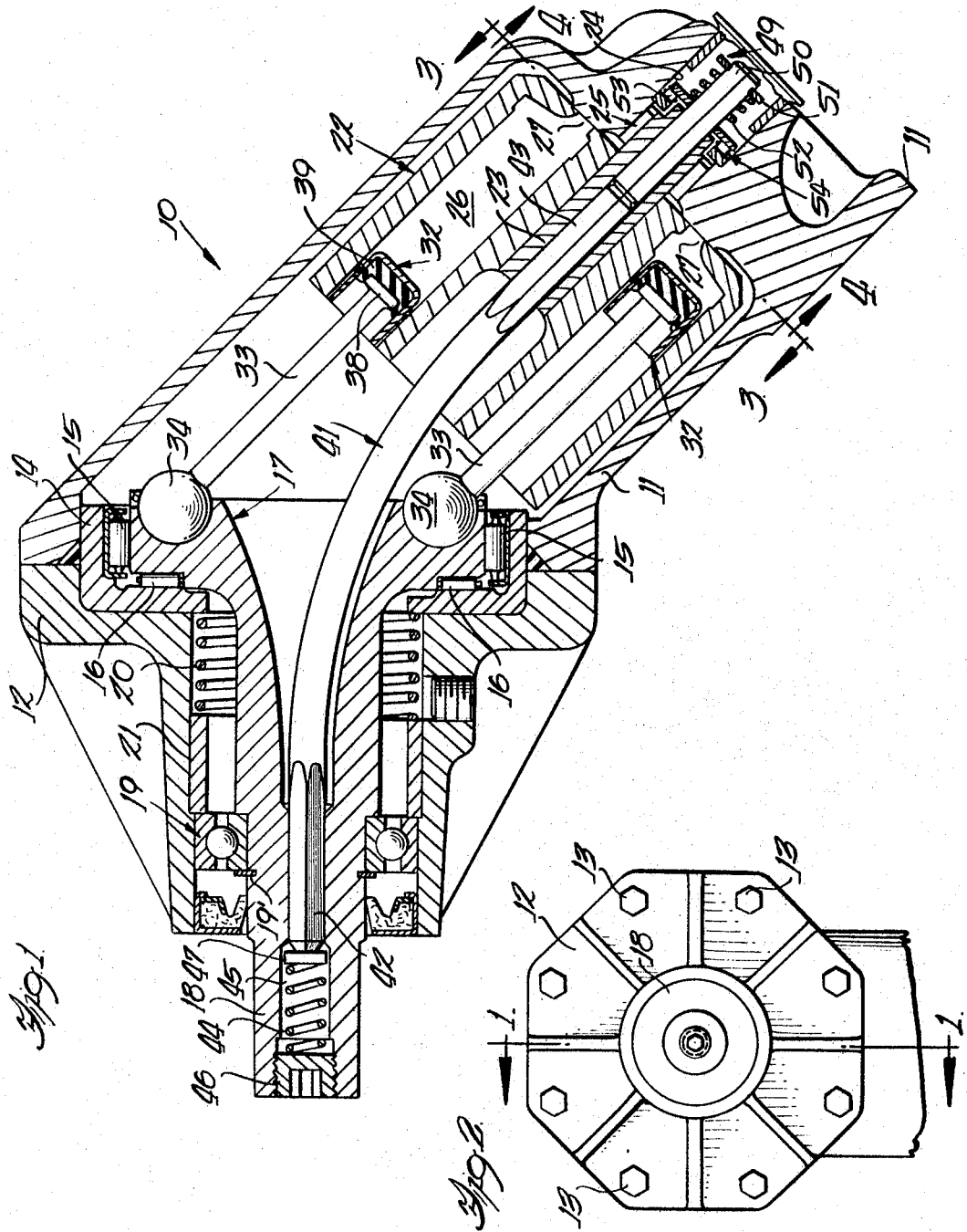

United States Patent Office 3,331,288
Patented July 18, 1967

---

3,331,288
PISTON MACHINE
C. Paul Kolthoff, Jr., Naperville, Ill., assignor to International Harvester Company, Chicago, Ill., a corporation of Delaware
Filed Jan. 7, 1965, Ser. No. 423,915
3 Claims. (Cl. 91—175)

This invention relates to fluid energy translating devices of the axial piston type which are capable of use either as motors or pumps. More in particular this invention relates to axial piston machines of the bent-axis type having a rotatable reaction member in a tilted plane.

In the bent-axis type of fluid energy translating devices the cylinder block must for fluid valving reasons be coupled to the force-reaction plate and its associated shaft so that both rotate in synchronized relation. Conventionally this is usually accomplished by employing gear means or a universal joint means to couple the two members together. Both the gear means and universal joint means are not only expensive in construction but require considerable space. Furthermore the gear means can be used only for fixed displacement fluid energy translating devices, while the simple types of universal joints fluctuate in speed excessively during each revolution.

Another difficulty with conventional fluid energy translating devices is that they are noisy during operation. To overcome these above mentioned difficulties the present invention employs a flexible central shaft to couple the fluid cylinder block to the force reaction plate and associated shaft. Also to reduce noise of operation and construction cost this invention contemplates employing a piston assembly wherein a resilient element is positioned at the juncture of the piston and its associated connecting rod.

It is an important object of the present invention to provide a fluid energy translating device which is quiet in operation and yet of reduced construction cost and space requirements.

A further object of the invention is to provide a fluid energy translating device wherein the cylinder block is coupled to the rotatable shaft by a flexible shaft thereby rotating the cylinder block at a velocity constant with respect to the velocity of the rotatable shaft.

A still further object of the present invention is to provide a novel type piston and associated connecting rod in a fluid energy translating device which is quiet in operation, simplified construction, and of low cost.

These and other important and desirable objects inherent in and encompassed by the invention will be more readily understood from the ensuing description, the appended claims and the annexed drawings wherein:

FIGURE 1 is a side elevation in section taken along the line 1—1 of FIGURE 2, illustrating a fluid energy translating device embodying the present invention;

FIGURE 2 is an end view of the device of FIGURE 1;

FIGURE 3 is a sectional view, taken on line 3—3 of FIGURE 1 illustrating the porting of the cylinder block of the device of FIGURE 1;

FIGURE 4 is a sectional view partly broken away, taken on line 4—4 of FIGURE 1, illustrating the arcuate valve plate and bearing supporting the cylinder block;

FIGURE 5 is an enlarged axial section view of one hydraulic piston and associated connecting rod of the device of FIGURE 1;

FIGURE 6 is a view of the flexible shaft prior to installation in the device of FIGURE 1;

FIGURE 7 is a sectional view, taken on line 7—7 of FIGURE 6, showing the cross-section of one portion of the flexible shaft; and FIGURE 8 is a sectional view, taken on line 8—8 of FIGURE 6, showing the cross-section of another portion of the flexible shaft.

Referring to the drawing in FIGURE 1 the numeral 10 indicates generally a fluid energy translating device which may be used as either a fluid pump or fluid motor for hydraulic power transmission. In the particular embodiment illustrated in FIGURE 1 the device 10 is a fixed displacement pump or motor of the bent-axis type. Although the fluid unit 10 as shown is of the fixed displacement type it will be appreciated by those skilled in the art that the present invention is applicable to a variable displacement fluid unit as well.

The fluid energy translating device 10 may comprise a casing 11 including an extension of said casing in the form of a cap 12 secured by a plurality of bolts 13. Disposed in recessed portions of the casing 11 and cap 12 is an annular member or bearing race 14 upon which bearing rollers 15, 16 abut in rolling relation as indicated in FIGURE 1. The bearing rollers 15, 16 support a force reaction plate indicated at 17 which is integral with a protruding rotatable shaft 18. If the unit 10 functions as a fluid pump then the shaft 18 is driven by an external source of power (not shown) and if the unit 10 functions as a fluid motor then the shaft 18 drives a load (not shown).

The rotatable shaft 18 is further supported by a conventional ball bearing indicated at 19. The bearing 19 is urged leftwardly, as viewed in FIGURE 1, by a compression spring 20 acting upon a slidable sleeve 21 as is evident from the drawing. From this it is apparent that the effect of the spring 20 is to urge the bearing 19 into engagement with snap ring 19′ disposed in an annular groove in the rotatable shaft 18 thus urging the force reaction plate 17 into abutting relation with bearing rollers 16.

Disposed rotatably in the casing 11 is a cylinder block or barrel indicated generally at 22. The block 22 includes a sleeve element 23 constrained in press-fit relation for rotation therewith. As seen from FIGURE 1 the sleeve element 23 extends into a bore 24 in the casing 11 in journalled relation by the bearing 25. Thus the cylinder block 22 is rotatable about the axis of the bearing 25.

Referring now to FIGURES 1 and 3 it will be seen that the cylinder block 22 includes seven cylinders 26. Each of the seven cylinders 26 is provided with a port 27 as shown. The ports 27 are positioned registerably with arcuate valve openings 28 and 29 illustrated in FIGURE 4. One of the valve openings 28, 29 is for high fluid pressure and the other for low fluid pressure. Thus if the fluid unit 10 is utilized as a motor high fluid pressure from a source (not shown) may be introduced through conduit 30 to valve opening 28 and low pressure fluid in valve opening 29 returned to the source through conduit 31. This would cause rotation of the cylinder block and shaft 18 in one direction.

From the foregoing it will be apparent that as the cylinder block 22 rotates each of the ports 27 of the respective cylinders 26 alternately register with the arcuate valve openings 28 and 29. It will also be apparent later herein that the cylinder block 22 rotates in phased relation with respect to the arcuate valve openings 28, 29.

Each of the cylinders 26 includes a novel piston indicated generally at 32. The piston 32 includes a connecting rod 33 the outer end thereof having a ball 34. The ball 34 is seated in a recess or socket of the force reaction plate 17 in a conventional manner.

Referring now to FIGURES 1 and 5 it will be seen that the piston 32 includes a cup-shaped member 35 having a skirt portion 36 and a head portion 37. The inner end portion of the connecting rod 33 is provided with a flange 38 positioned concentrically within the cup-shaped member 35 as seen best in FIGURE 5. Now the novel feature of the piston 32 is the resilient connection between the inner end portion of the connecting rod 33, such as the flange 38, with the cup-shaped member 35. In the present embodiment the flange 38 is in bonded relation with a resilient elastomer or plastic element 39, which plastic element is also in bonded relation with the inner surface of the cup-shaped member 35. The plastic element 39 should be of a suitable composition such that the fluid medium used in operating the device 10 does not deteriorate it. For example, if the operating fluid medium is oil derived from petroleum, the plastic element 39 may conveniently be comprised of an elastomer known as neoprene. Obviously other elastomeric compositions which are not deteriorated by the selected operating fluid medium may be employed if desired. However, it is preferred to employ a plastic element 39 which is sufficiently resilient so that the connecting rod 33 may be angularly shifted as may be required during operation as indicated by the phantom lines in FIGURE 5.

From the above it will be apparent that when a piston 32 of the device 10 is on a power stroke the plastic element 39 resiliently deforms to relieve any shock load the connecting rod 33 may encounter thus resulting in a more quiet operation. Furthermore, it can readily be seen that the plastic element 39 displaces the need for a conventional bearing means between a piston and its associated connecting rod thus permitting a much lower construction cost. The cup-shaped member may be made as a stamped cup as shown or as a machine part. The interior cavity is not critical, however, and greatly reduced tolerances can be employed, compared to the conventional piston-connecting rod attachment means. Also, if desired, the cup-shaped member 35 may be provided with an annular groove or grooves in the skirt portion to accommodate conventional piston sealing rings, one of which is illustrated at 40 in FIGURE 5.

Referring back to FIGURE 1 it has been stated previously that the cylinder barrel 22 must be constrained in timed rotation with the force reaction plate 17. Conventionally, the cylinder barrel 22 is coupled drivenly to the force reaction plate 17 by means of gearing or a conventional universal joint. Gearing is limited to those applications having a fixed angle between the cylinder barrel and force reaction plate. While this type device is indicated in FIGURE 1 for purposes of simplicity, it will be evident to those skilled in the art that the present invention is equally applicable to fluid energy translating devices which have variable angles between cylinder barrel and reaction plate. With the conventional designs of universal joint coupling means the rotational speed of the cylinder barrel is not constant with respect to the rotational speed of the force reaction plate. This causes the ports 27 of the cylinders 26 to become somewhat out-of-phase with reference to the arcuate valve openings 28 and 29 resulting in a lower efficiency of the fluid energy translating device 10. The present invention contemplates the coupling of the cylinder barrel 22 to the force reaction plate 17 by means of a flexible central shaft indicated generally at 41 in FIGURES 1 and 6. The flexible central shaft 41 may be constructed, for example, of a central wire core with several layers of fine or small diameter wires wound about it as is conventionally known. Other conventional construction forms of flexible shaft may be conveniently used. Both end portions 42 and 43 are of square cross-section as may be evident from FIGURES 1, 6, 7 and 8.

The end portion 42 of the flexible central shaft 41 slidably fits into a longitudinal hole, having a matching cross-section, in the rotatable shaft 18 as may be evident from FIGURE 1. Thus the flexible central shaft 41 is constrained for rotation with the rotatable shaft 18 and its associated force reaction plate 17.

Now in order to permit a limited axial movement of the flexible central shaft 41 with respect to the rotatable shaft 18, a compression spring 44 is positioned within a recess 45 in the shaft 18. The leftward end of the spring 44 is seated against a plug 46 threadedly fit into the end portion of the shaft 18 as seen in FIGURE 1. The other end of the spring 44 bears against a slidable plate 47 in the recess 45 which in turn abuts the leftward end of the flexible shaft 41. Thus it is apparent that the spring 44 yields to permit axial sliding of the end portion 42 of the flexible shaft 41 with respect to the rotatable shaft 18. This is necessary so that binding is avoided due to temperature changes and also, if the device 10 is of the variable fluid displacement type, to compensate for the changes in the operative length requirement of the shaft 41.

The torsional load upon the flexible central shaft 41 is of a low magnitude. The forces of the actuated pistons 32 urges the cylinder block 22 in a rightward direction as viewed in FIGURE 1. These forces are balanced by hydraulic forces in the opposite direction acting upon the annulus 48 (FIGURE 4) formed by the arcuate valve openings 28 and 29 as is familiar to those skilled in the art. However, in order to avoid any spontaneous separation of the cylinder block 22 from the annulus 48 portion of the casing 11 a spring-load mechanism, indicated generally at 49 in FIGURE 1, is employed to urge the cylinder block 22 axially into abutment with the casing 11. The mechanism 49 may conveniently be comprised of a pin 50 press-fitted into an axial hole in sleeve element 23. Thus the pin 50 is constrained for rotation with cylinder block 22. The end portion 43 of the flexible central shaft 41 having a square cross-section is axially slidable in the hole of matching cross-section in the sleeve element 23 and may abut the inner end of the pin 50 as shown in FIGURE 1. The outer end portion of the pin 50 is provided with a snap ring 51 upon which one end of a compression spring 52 rests. The other end of the spring 52 bears upon a slidable thrust washer 53 which in turn bears upon a thrust bearing 54. The thrust bearing 54 rests against a shoulder in the casing 11 as evident from FIGURE 1. Thus the spring 52 serves to urge the cylinder block 22 axially against the lower portion of the casing 11 in abutting relation as shown.

Since the torsional load upon the flexible central shaft 41 is of a low magnitude because (1) the resistance of the bearings 25 and 54 is low, (2) forces between cylinder 22 and housing 11 are small, and (3) the parts are well lubricated, very little "wind-up" of the flexible rod 41 occurs. However, it may be desirable to compensate for any wind-up of the flexible shaft 41 through phasing adjustment of the position of the arcuate valve openings 28, 29 so that maximum efficiency of the device 10 is achieved.

Having now described an embodiment of the invention it can now be seen that the objects of invention have been fully achieved and it must be understood that changes and modifications may be made which do not depart from the spirit of the invention as disclosed nor from the scope thereof as defined in the appended claims.

What is claimed is:

1. A fluid energy translating device comprising, in combination a casing having fluid inlet and outlet means, a force-reaction plate member journalled for rotation about a first axis disposed in said casing, a rotatable shaft constrained for rotation with said force-reaction plate member, a cylinder block member disposed in said casing journalled for rotation about a second axis, said first axis intersecting said second axis at a point between said members, a plurality of fluid cylinders in said cylinder block member connected to said force-reaction plate member in operative relation, valve means in said casing and said cylinder block member cooperatively positioned to communicate said fluid inlet and outlet means with said fluid cylinders, a flexible central shaft having one end portion thereof constained for rotation with said force-reaction plate member on said first axis and the other end portion thereof constrained for rotation with said cylinder block member on said second axis so that the velocity of rotation of said cylinder block member is equal to the velocity of rotation of said force reaction plate member to phase said valve means operatively for translating energy between said rotatable shaft and said fluid inlet and outlet means, and resilient means disposed in at least one of said members positioned to urge yieldably an end of said flexible central shaft toward the point of intersection of said axes whereby a change in the operative length requirements of said flexible central shaft is compensated.

2. A fluid energy translating device according to claim 1 wherein at least one end portion of said flexible central shaft is axially slidable with respect to its associated member.

3. A fluid energy translating device according to claim 1 wherein said resilient means comprises a compression spring disposed in a recess in said force-reaction plate member, a slidable plate disposed in said recess having one side thereof abutting one end of said spring and the other side thereof abutting one end of said flexible central shaft.

References Cited
UNITED STATES PATENTS

| | | | |
|---|---|---|---|
| 1,812,510 | 6/1931 | Berge | 64—2 |
| 2,958,349 | 11/1960 | McNutt | 64—2 |
| 3,037,489 | 6/1962 | Douglas | 91—176 |
| 3,043,120 | 7/1962 | Waldron | 64—2 |
| 3,050,014 | 8/1962 | Sullivan | 103—162 |
| 3,056,358 | 10/1962 | Pedersen et al. | 103—162 |

MARTIN P. SCHWADRON, *Primary Examiner.*

PAUL E. MASLOUSKY, *Examiner.*